(12) United States Patent
Glass et al.

(10) Patent No.: US 12,553,644 B2
(45) Date of Patent: Feb. 17, 2026

(54) INTEGRATED ANODE FOR A HEAT EXCHANGER

(71) Applicant: Rheem Manufacturing Company, Atlanta, GA (US)

(72) Inventors: Robert Stuart Glass, Tuscaloosa, AL (US); Terence Sean Doyle, Oak Park, CA (US); Juan Carlos Montanez, Oxnard, CA (US); Owen Lewis Joyce, Cary, NC (US); William Kevin Carpenter, Warrensville, NC (US); Timothy Curtis Simmons, Jr., Charlotte, NC (US); Alexander Adam Papp, Raleigh, NC (US)

(73) Assignee: Rheem Manufacturing Company, Atlanta, GA (US)

( * ) Notice: Subject to any disclaimer, the term of this patent is extended or adjusted under 35 U.S.C. 154(b) by 0 days.

(21) Appl. No.: 18/812,722

(22) Filed: Aug. 22, 2024

(65) Prior Publication Data
US 2024/0418408 A1    Dec. 19, 2024

Related U.S. Application Data

(60) Division of application No. 18/048,685, filed on Oct. 21, 2022, now abandoned, which is a continuation of
(Continued)

(51) Int. Cl.
*F24H 9/45* (2022.01)
*C23F 13/10* (2006.01)
(Continued)

(52) U.S. Cl.
CPC ............. *F24H 9/455* (2022.01); *C23F 13/10* (2013.01); *F24H 1/40* (2013.01); *F24H 9/20* (2013.01);
(Continued)

(58) Field of Classification Search
CPC ... C23F 13/10; F24H 1/40; F24H 9/20; F24H 9/455; F24H 15/219; F24H 15/238;
(Continued)

(56) References Cited

U.S. PATENT DOCUMENTS

| 1,020,480 A | * | 3/1912 | Cumberland | C23F 13/10 174/18 |
| 2,405,776 A | * | 8/1946 | Brolinson | C23F 13/10 204/288 |

(Continued)

FOREIGN PATENT DOCUMENTS

| CN | 208952067 A | 6/2019 |
| GB | 968970 A | 9/1964 |

(Continued)

*Primary Examiner* — Steven B Mcallister
*Assistant Examiner* — Benjamin W Johnson
(74) *Attorney, Agent, or Firm* — Eversheds Sutherland (US) LLP (57) ABSTRACT

A water heater can include a heat source and a heat exchanger that transfers heat to the water. A header attached to the heat exchanger provides an inlet and an outlet for water to flow into and out of the heat exchanger. The header can also include an anode assembly that releasably attaches to the header. The anode assembly can be located at a bottom of the header so that an anode in the anode assembly remains in contact with the water when water is flowing through the heat exchanger.

19 Claims, 5 Drawing Sheets

Related U.S. Application Data application No. 16/600,277, filed on Oct. 11, 2019, now Pat. No. 11,499,748.

(51) Int. Cl.

| | | |
|---|---|---|
| *F24H 1/40* | (2022.01) | |
| *F24H 9/20* | (2022.01) | |
| *F24H 1/54* | (2022.01) | |
| *F24H 15/219* | (2022.01) | |
| *F24H 15/238* | (2022.01) | |
| *F24H 15/242* | (2022.01) | |
| *F24H 15/36* | (2022.01) | |
| *F28D 7/16* | (2006.01) | |
| *F28D 21/00* | (2006.01) | |
| *F28F 9/02* | (2006.01) | |
| *F28F 19/00* | (2006.01) | |

(52) U.S. Cl.
CPC .............. *F24H 1/54* (2022.01); *F24H 9/2007* (2013.01); *F24H 15/219* (2022.01); *F24H 15/238* (2022.01); *F24H 15/242* (2022.01); *F24H 15/36* (2022.01); *F28D 7/1623* (2013.01); *F28D 7/1692* (2013.01); *F28D 2021/0024* (2013.01); *F28F 9/02* (2013.01); *F28F 19/004* (2013.01); *F28F 2250/06* (2013.01)

(58) Field of Classification Search
CPC .......... F24H 15/242; F24H 15/36; F24H 1/54; F24H 9/2007; F28D 7/1623; F28D 7/1692; F28D 2021/0024; F28F 9/02; F28F 19/004; F28F 2250/06
USPC ....................................................... 122/18.4
See application file for complete search history.

(56) References Cited

U.S. PATENT DOCUMENTS

| | | | |
|---|---|---|---|
| 2,666,625 A * | 1/1954 | Byerley | ................... F22D 1/32 |
| | | | 165/110 |
| 3,012,958 A | 12/1961 | Mxler | |
| 3,660,264 A | 5/1972 | Schuller | |
| 3,867,274 A | 2/1975 | Herman | |
| 4,910,865 A | 3/1990 | Houle | |
| 5,365,887 A | 11/1994 | Fenn | |
| 5,901,563 A | 5/1999 | Yarbrough et al. | |
| 6,295,980 B1 * | 10/2001 | Lopez | ....................... F28F 9/02 |
| | | | 122/18.4 |
| 7,655,116 B1 * | 2/2010 | Tilsner | .................... C23F 13/18 |
| | | | 204/196.15 |
| 7,971,603 B2 | 7/2011 | Willis et al. | |
| 8,068,727 B2 | 11/2011 | Phillips et al. | |
| 8,380,055 B1 | 2/2013 | Bridegum | |
| 8,840,785 B2 | 9/2014 | Furukawa et al. | |
| 8,890,703 B2 | 11/2014 | Farris et al. | |
| 9,074,383 B2 | 7/2015 | McQueen et al. | |
| 9,499,915 B2 | 11/2016 | Al-Mahrous et al. | |
| 10,604,851 B1 | 3/2020 | Garza et al. | |
| 10,934,184 B2 | 3/2021 | Denkewicz | |
| 2008/0179051 A1 * | 7/2008 | Willis | ...................... F28F 9/02 |
| | | | 165/173 |
| 2008/0190919 A1 | 8/2008 | Kahite et al. | |
| 2010/0017042 A1 | 1/2010 | Lopata | |
| 2010/0126698 A1 * | 5/2010 | Deivasigamani | ..... F28F 19/004 |
| | | | 165/104.19 |
| 2019/0195534 A1 | 6/2019 | Chaudhry et al. | |

FOREIGN PATENT DOCUMENTS

| | | |
|---|---|---|
| JP | S63123998 A | 5/1988 |
| JP | H09178391 A | 7/1997 |
| RU | 55313 U1 | 8/2006 |
| RU | 2672140 C1 | 11/2018 |
| WO | 2012050131 A1 | 2/2014 |

* cited by examiner

INTEGRATED ANODE FOR A HEAT EXCHANGER

CROSS REFERENCE TO RELATED APPLICATIONS

This application is a divisional of U.S. application Ser. No. 18/048,685, filed on Oct. 21, 2022, which is a continuation of and claims priority to and the benefit of U.S. application Ser. No. 16/600,277, filed on Oct. 11, 2019, both of which are hereby incorporated by reference herein.

TECHNICAL FIELD

Embodiments described herein relate generally to heat exchangers for water heating devices, and more particularly to an anode integrated into the heat exchanger.

BACKGROUND

Water heating devices such as pool and hot tub heaters, boilers, and residential and commercial water heaters contain a heat exchanger that permits the transfer of heat to the water that is to be heated. The heat can be generated by any of a variety of sources including combustion, an electric heating element, or solar power. The heat exchanger and associated components that are in continuous or frequent contact with the water that is being heated are typically made from metallic materials that can corrode over time after exposure to water. One solution for protecting metallic surfaces from corrosion due to water exposure is to apply a protective coating to the metallic surfaces. However, in some cases, a protective coating may not be easily applied to a metallic surface or the protective coating may dissipate over time. Another solution for protecting metallic surfaces from corrosion due to water exposure is the use of a sacrificial anode. The anode is typically made from a material, such as zinc, magnesium, or aluminum, that corrodes more easily than the components of the heat exchanger. The anode has more negative electrochemical potential than the heat exchanger components it is protecting and this electrical potential difference causes the anode to corrode instead of the heat exchanger components, thereby protecting the heat exchanger components.

Figure 1:
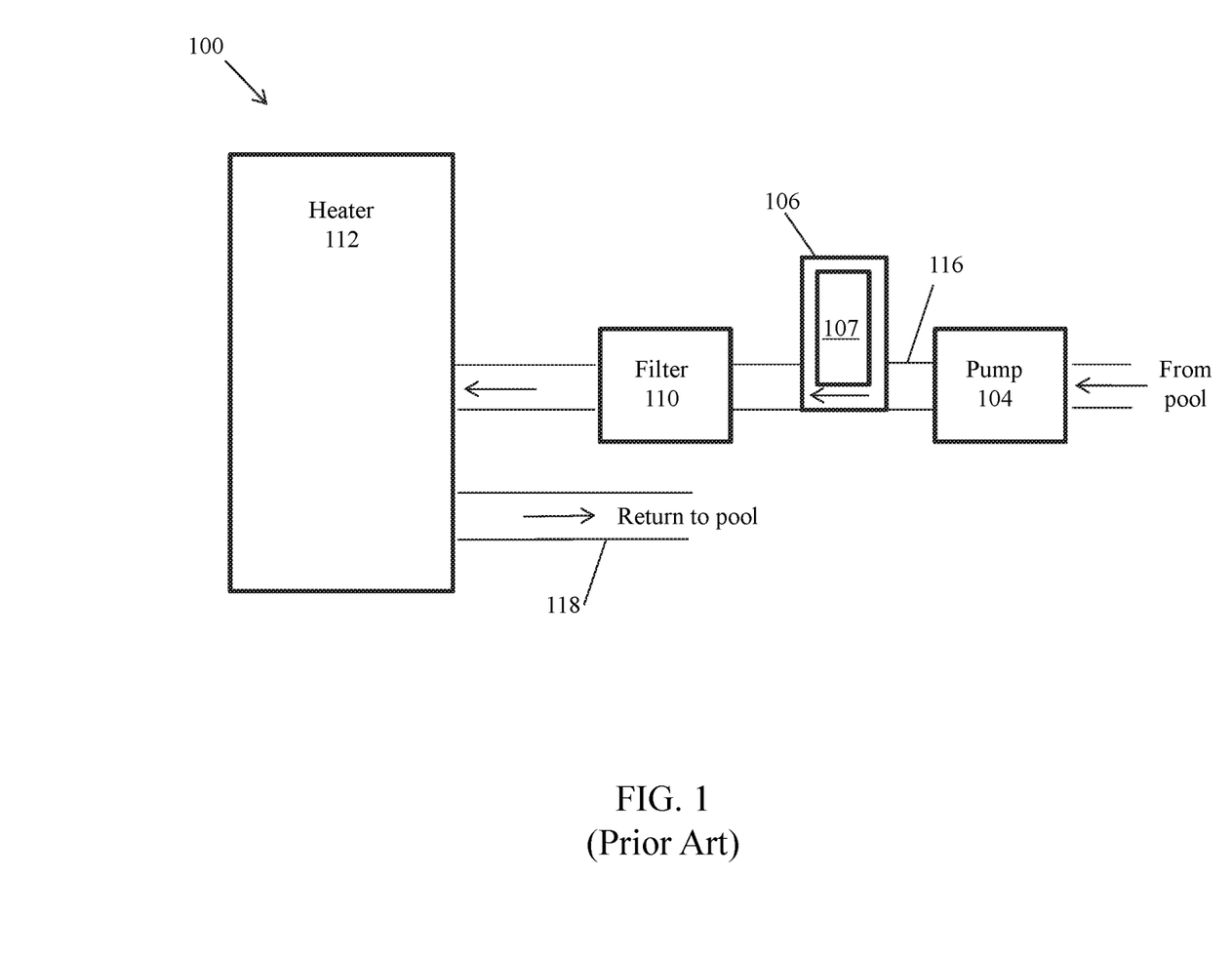
FIG. 1 is an example a water heating system for a pool as known in the prior art.

Referring now to FIG. 1, an example of a prior art water heating system 100 for a pool is shown. The water heating system comprises a pump 104 that draws water from a pool and directs the water along inlet pipe 116 and through an anode assembly 106 and a filter 110 to a heater 112. The arrows in the water heating system 100 show the general direction of flow of the water. After the water is heated in the heater 112 it is returned to the pool via outlet pipe 118. The anode assembly 106 includes a sacrificial anode 107 that interacts with the water as it flows from the pump 104 to the filter 110. There are several shortcomings with the anode assembly 106 illustrated in the prior art heating system 100. First, the anode assembly is mounted vertically above the inlet pipe 116 transporting the water so that the anode 107 extends downward into the water flowing through the pipe. In the orientation shown in the prior art system of FIG. 1, the anode may not always be submerged in the water flowing through inlet pipe 116, particularly after the bottom of the anode 107 has begun to erode. If the anode is not submerged in the water flowing through the inlet pipe 116, the anode cannot protect the other metallic components of the heating system 100 that are in contact with the water. Second, anode assemblies mounted vertically above the inlet pipe 116 as shown in FIG. 1 can trap air within the anode assembly 106 when the pump 104 turns off and the air must be released periodically so that it does not interfere with the heating system. Third, prior art anode assemblies such as the one shown in FIG. 1 typically involve attaching a separate bolt to the anode so that the anode can be attached to the anode assembly. The separate bolt that must be attached to the anode can result in a poor bonding connection between the anode and the bolt thereby impeding the performance of the anode. Fourth, mounting the anode assembly 106 separately from the heater 112 and upstream of the heater adds to the complexity and labor involved in installing and maintaining the heating system 100.

In view of these shortcomings, there is a need for an improved anode for use with water heating devices.

SUMMARY

In general, in one aspect, the disclosure relates to a water heater comprising a combustion chamber, an exhaust vent, and a heat exchanger. The heat exchanger comprises a series of tubes through which water passes and the heat exchanger is positioned to transfer heat from combustion gases originating in the combustion chamber to the water passing through the series of tubes. The heat exchanger further comprises a header. The header includes an inlet through which water enters the heat exchanger, an outlet through which water exits the heat exchanger, and an anode assembly directly attached to the header. In one example, the anode assembly includes an anode housing that contains an anode. The anode assembly is removably attached to the header so that the anode can be replaced. The anode assembly can be attached to a bottom side of the header and adjacent to the inlet so that the anode remains in contact with the water whenever water is flowing into the header.

In general, in another aspect, the disclosure relates to a water heating device comprising a heat source and a heat exchanger. The heat exchanger comprises a series of tubes through which water passes and the heat exchanger is positioned to transfer heat from the heat source to the water passing through the series of tubes. The heat exchanger further comprises a header. The header includes an inlet through which water enters the heat exchanger, an outlet through which water exits the heat exchanger, and an anode assembly directly attached to the header. In one example, the anode assembly includes an anode housing that contains an anode. The anode assembly is removably attached to the header so that the anode can be replaced. The anode assembly can be attached to a bottom side of the header and adjacent to the inlet so that the anode remains in contact with the water whenever water is flowing into the header.

These and other aspects, objects, features, and embodiments will be apparent from the following description and the appended claims.

BRIEF DESCRIPTION OF THE DRAWINGS

The drawings illustrate only example embodiments of a water heating device with an anode integrated into the heat exchanger. Therefore, the example embodiments of the drawings are not to be considered limiting in scope, as a heat exchanger with an integrated anode can be applied to a variety of water heating devices. The elements and features shown in the drawings are not necessarily to scale, emphasis instead being placed upon clearly illustrating the principles of the example embodiments. Additionally, certain dimensions or positions may be exaggerated to help visually convey such principles.

DETAILED DESCRIPTION OF EXAMPLE EMBODIMENTS

The example embodiments discussed herein are directed to systems, methods, and devices for integrating an anode into the heat exchanger of a water heating device. While a pool heater is referenced in the example embodiments described in connection with the drawings, the disclosed embodiments can be applied to a variety of water heating devices including hot tub heaters, boilers, and commercial and residential water heaters. The configuration of the example heat exchangers described herein allows the anode to be integrated into the heat exchanger. As described further below in connection with drawings, integrating the anode into the heat exchanger provides several benefits with respect to the performance and maintenance of the anode and the water heating device.

Example embodiments of water heating devices will be described more fully hereinafter with reference to the accompanying drawings, in which example embodiments of water heating devices are shown. Water heating devices may, however, be embodied in many different forms and should not be construed as limited to the example embodiments set forth herein. Rather, these example embodiments are provided so that this disclosure will be thorough and complete, and will fully convey the scope of water heaters to those of ordinary skill in the art. Like, but not necessarily the same, elements (also sometimes called components) in the various figures are denoted by like reference numerals for consistency.

Figure 2:
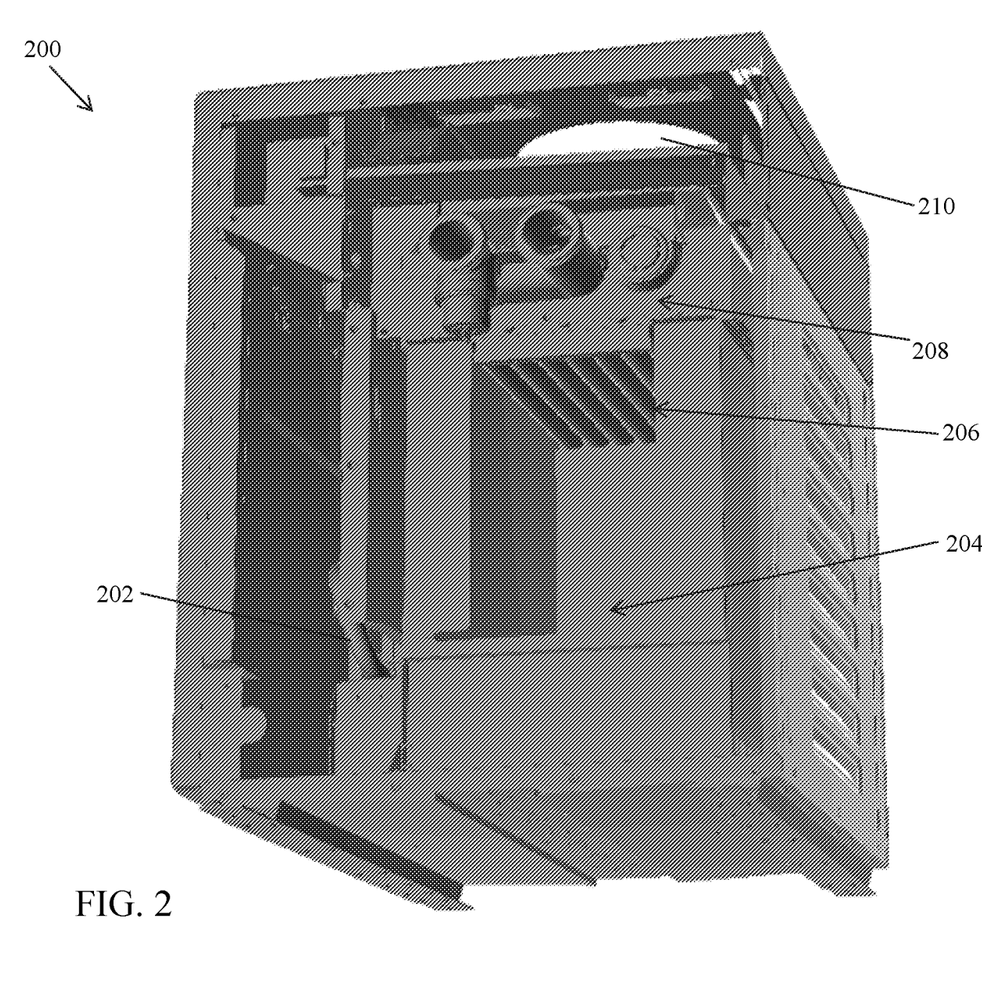
FIG. 2 illustrates a pool heater in accordance with an example embodiment of the present disclosure.

Referring now to FIG. 2, an example water heater 200 for a pool is illustrated. The water heater 200 comprises a combustion chamber 204, a heat exchanger 206, and an exhaust vent 210. The example water heater 200 is an "up fired" water heater in that the combustion chamber 204 is located below the heat exchanger. However, it should be understood that the embodiments described herein can also be applied to "down fired" water heaters as well as water heaters having other configurations. Furthermore, the embodiments described herein can also be applied to water heating devices that use heat sources other than combustion, such as electric or solar heat sources.

When in operation, the water heater 200 receives fuel, such as natural gas or propane, via fuel line 202. The fuel is combined with air and ignited at one or more burners in the combustion chamber 204. The ignition of the fuel and air in the combustion chamber produces hot combustion gases that flow upward and around the outside surfaces of heat exchanger tubes of the heat exchanger 206. Heat from the combustion gases is transferred through the walls of the heat exchanger tubes to heat water passing through the interior of the heat exchanger tubes. The heat exchanger and the heat exchanger tubes can have any one of a variety of shapes and configurations to optimize the transfer of heat from the combustion gases passing over the outer surface of the heat exchanger to the water passing through the interior of the heat exchanger tubes. After passing through the heat exchanger 206, the combustion gases can exit the water heater 200 via exhaust vent 210.

In addition to the heat exchanger tubes, the heat exchanger 206 comprises a header 208. In the example shown in FIG. 2, the header 208 attaches to the open side of the heat exchanger 206. As will be described further below, the header comprises an inlet and an outlet that permit the flow of water into and out of the heat exchanger 206. However, it should be understood that the example embodiments described herein can apply to headers having other configurations.

The foregoing is a simplified description of the operation of the water heater to provide a framework for the example embodiments described herein. It should be understood that various other components can be included in the water heater, but a description of those components is not included so as not to obscure the example embodiments described herein.

Referring now to FIGS. 3, 4, 5 and 6, more detailed views of example heat exchanger 206 are shown. The heat exchanger 206 comprises a first end plate 304 at one end of the heat exchanger 206 and a second end plate 306 at the opposite end. Extending between the first end plate 304 and the second end plate 306 are an array of heat exchanger tubes 302. The array of heat exchanger tubes 302 can be a single row or multiple rows of heat exchanger tubes and the tubes can have a variety of shapes and features to optimize heat transfer to the water flowing within the heat exchanger tubes 302.

Figure 6:
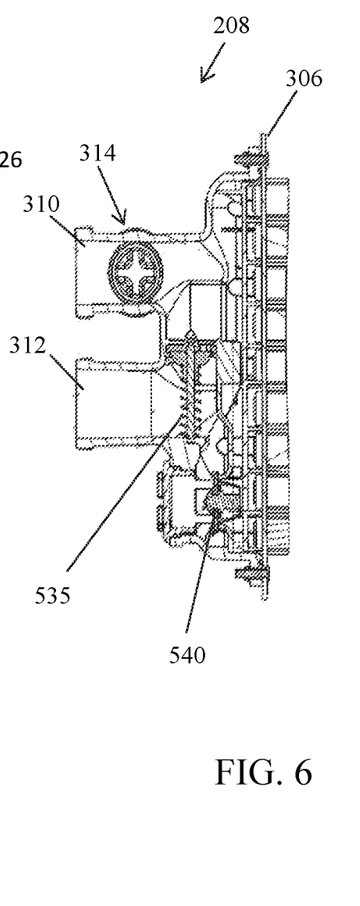
FIG. 6 illustrates a partial cross sectional view of the example heat exchanger of FIG. 3.

Attached to the second end plate 306 is the header 208. The header 208 can also be referred to as an open header to distinguish it from the return header at the opposite end of the heat exchanger 206. The header 208 comprises an inlet 310 that receives water from a pool or other vessel and an outlet 312 from which the water exits the heat exchanger 206. As shown in FIG. 6, a first subset of the heat exchanger tubes receive incoming water from the inlet 310 and direct the water towards the first end plate 304. Adjacent the first end plate 304 is a return header 326 that permits the water to flow from the first subset of the heat exchanger tubes and into a second subset of heat exchanger tubes where the water flows in the opposite direction and towards the outlet 312. In alternate embodiments, the heat exchanger tubes 302 can comprise more than one turn or be straight through in a single pass arrangement.

Figure 5:
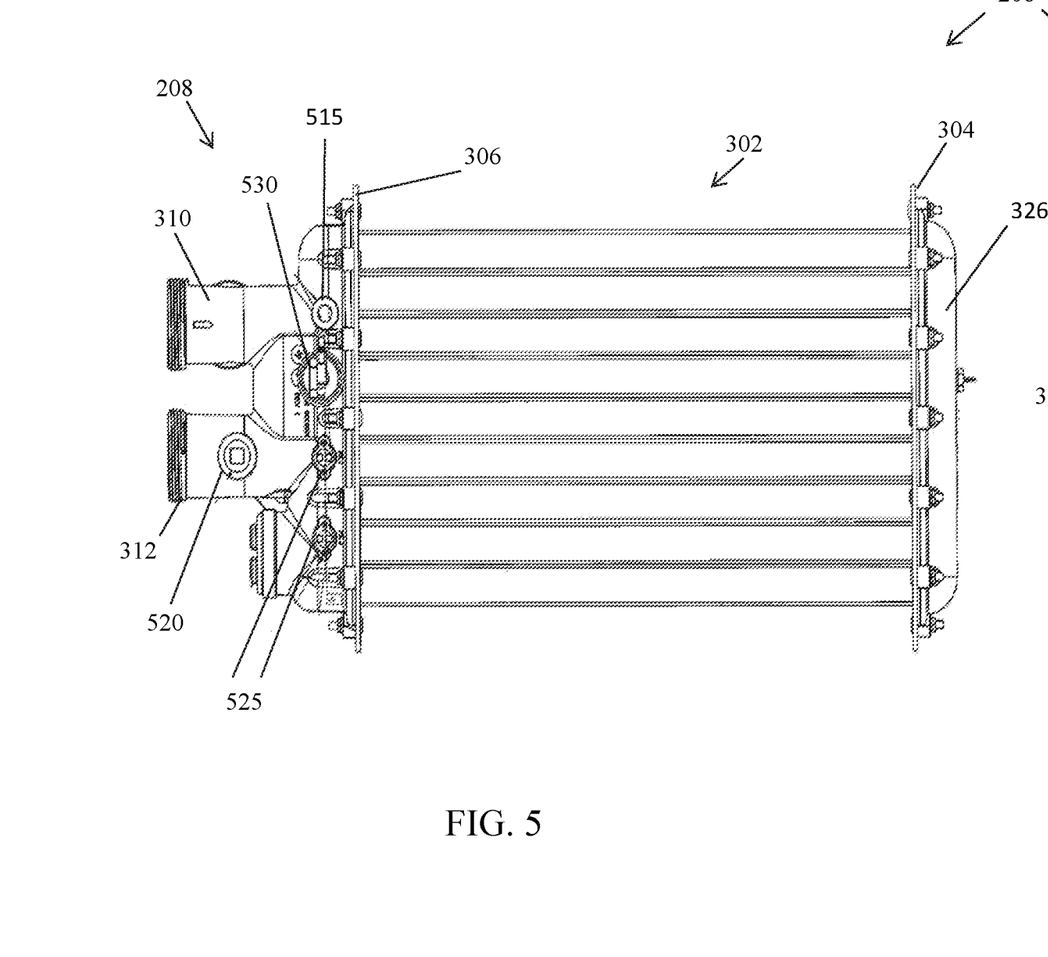
FIG. 5 illustrates a top view of the example heat exchanger of FIG. 3.

The header 208 can further comprise one or more components such as a pressure relief valve 520, one or more temperature limit switches 525, a pressure switch 530, and a temperature sensor 515. The pressure switch 530 can ensure that adequate water is flowing through the heat exchanger 206 before the heating source is turned on. A flow switch or similar device may be used in place of the pressure switch 530 to ensure adequate water flow. The temperature limit switches can be used to monitor the temperature of the water exiting the heat exchanger 302 for safety and performance of the heating system. If one or more temperature limit switches 525 indicate the water exiting the heat exchanger is too hot, they will shut down the heat source to the unit.

FIG. 6 provides a cross section of a portion of the heat exchanger 206 and illustrates the bypass valve 535 and the thermal governor valve 540 within the header 208. The bypass valve 535 includes a spring and allows water flowing into the inlet 310 to bypass the heat exchanger tubes 302 and directly exit through the outlet 312, for example, if the pressure of the water flowing into the heat exchanger 206 is too great. The thermal governor valve 540 is temperature activated and controls the flow of water exiting through the outlet 312. For example, the thermal governor valve 540 will open further as the water temperature increases at the thermal governor valve 540 to permit water to flow through the heat exchanger 206 faster so that the water does not spend as much time within the heat exchanger 206 absorbing heat.

FIGS. 3-6 also provide views of the anode assembly 314. As shown in the figures, the anode assembly 314 is attached to an aperture at the bottom side of the header 208 so that the anode located within the anode assembly 314 remains in contact with the water in the header 208. The position of the anode assembly 314 at the aperture in the bottom side of the header 208 is more advantageous than the position of the anode assembly 106 of the prior art heating system illustrated in FIG. 1. As described above, the anode assembly 106 of the prior art system is susceptible to situations where the anode will not be in contact with water flowing to the heater. In contrast, placing the anode assembly 314 at the bottom surface of the header 208 ensures that the water entering the header 208 will come into contact with the anode. Additionally, in the example shown in FIGS. 3-6, the anode assembly 314 is placed adjacent to the inlet 310 so that the water flowing into the header will encounter the anode before the water continues into the heat exchanger tubes 302. In alternate embodiments, the placement of the anode assembly 314 on the header 208 can be varied, however, it is preferable that the anode assembly be positioned to optimize contact between the anode and the water flowing into the heat exchanger 206.

An additional benefit to placing the anode assembly 314 at the bottom surface of the header 208 is that it avoids the problem encountered in the prior art heating system of FIG. 1 wherein air becomes trapped in the anode assembly when the pump turns off. When the anode assembly is located at the bottom surface of the header 208, water entering the header 208 simply flows into the anode assembly and around the anode. When the pump is turned off, there may be residual water remaining in the header 208 but the orientation of the anode assembly 314 does not permit air to become trapped within the anode assembly 314.

As shown in FIGS. 3-6, the anode assembly 314 is removably attached to the header 208 so that it is integrated into the header. In the example heat exchanger 206, the anode assembly 314 has threads which attach to complementary threads on the bottom surface of the header 208. In alternate embodiments, the anode assembly 314 can be attached to the header 208 using other coupling mechanisms. Integrating the anode assembly into the header 208 provides advantages in that a separate anode does not need to be installed upstream of the heater as illustrated in the prior art heating system of FIG. 1.

Figures 3, 4:
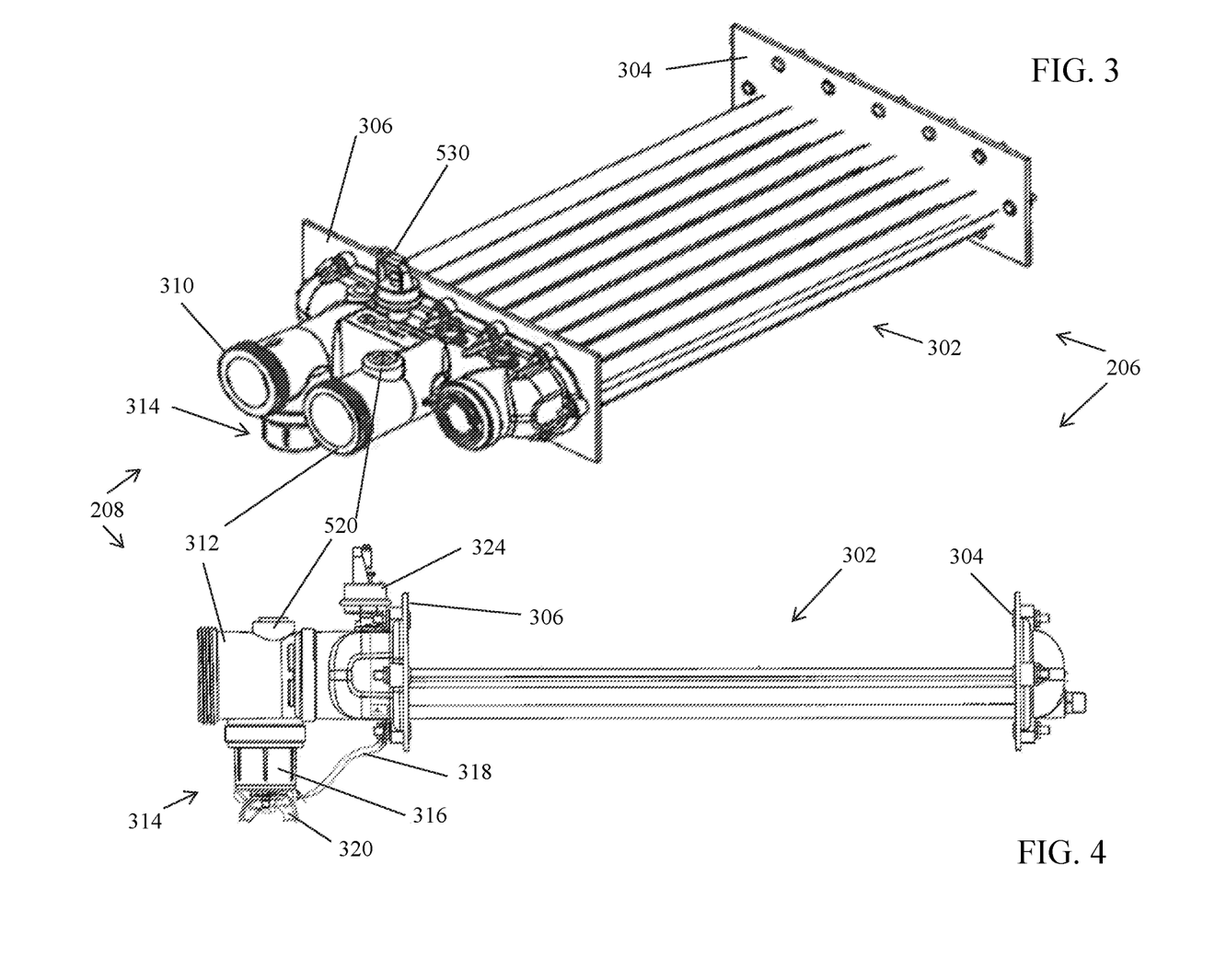
FIG. 3 illustrates a perspective view of a heat exchanger in accordance with an example embodiment of the present disclosure.
FIG. 4 illustrates a side view of the example heat exchanger of FIG. 3.

The side view of the heat exchanger 206 provided in FIG. 4 illustrates the bonding wire 318 that attaches the anode to the heat exchanger 206. The bonding wire attaches to an outer anode stud extending from anode assembly 314 and a nut 320 secures the bonding wire to the outer anode stud.

Figure 7:
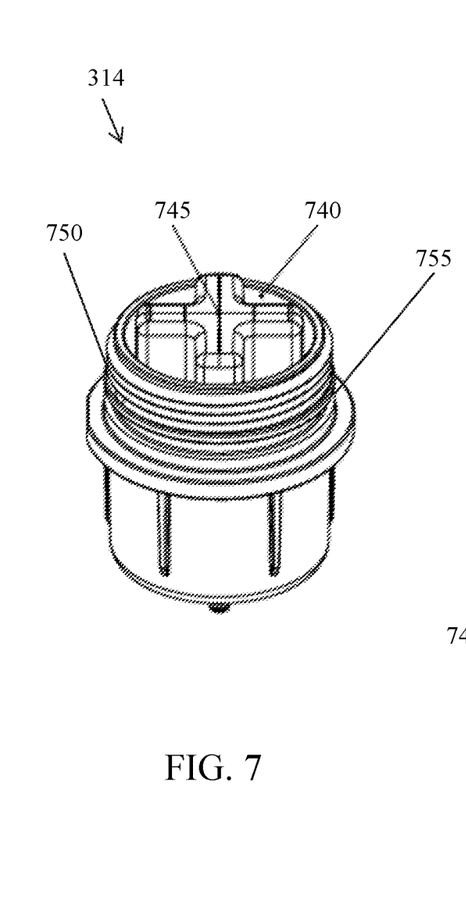
FIG. 7 illustrates a top perspective view of an anode assembly m accordance with an example embodiment of the present disclosure.
Figure 8:
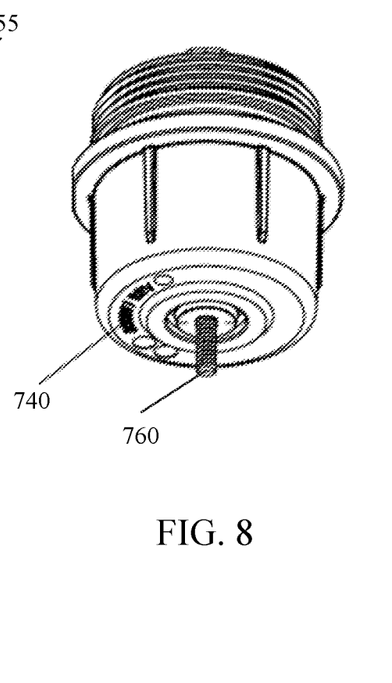
FIG. 8 illustrates a bottom perspective view of the example anode assembly of FIG. 7.
Figure 9:
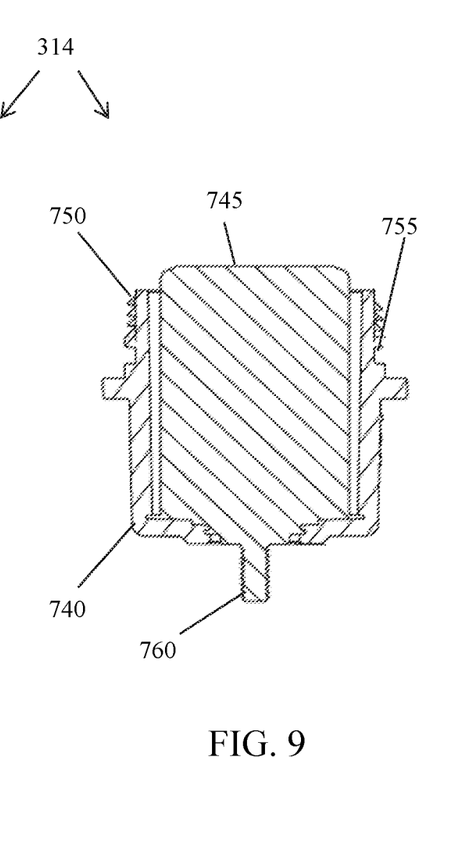
FIG. 9 illustrates a cross sectional view of the example anode assembly of FIG. 8.

Referring now to FIGS. 7, 8 and 9, the anode assembly 314 is illustrated in greater detail. The anode assembly 314 comprises an anode housing 740 which holds the anode 745. As explained previously, when the anode assembly 314 is attached to the bottom surface of the header 208, water can flow through the inlet 310 and into the anode assembly 314 where the water contacts the anode 745. As illustrated in FIGS. 7-9, the anode can have a shape that optimizes its surface area to encourage interaction with the water. In other embodiments, the anode 745 can have other shapes and sizes.

The outer top portion of the anode housing 740 comprises threads 750 that engage complementary threads at the bottom surface of the header 208. Below the threads 750, a notch can accommodate a gasket so that the anode housing can achieve a water tight seal when attached to the header 208.

As shown in the cross sectional view of FIG. 9, the anode can comprise an inner anode portion that resides within the anode housing 740 and an outer anode stud 760 extending from the anode housing 740. The outer anode stud 760 provides a convenient location for attaching the bonding wire 318 as described in connection with FIG. 4. Additionally, the anode 745 can be formed as a single component so that the outer anode stud does not need to be separately attached to the anode. Forming the inner anode portion and the outer anode stud 760 as a continuous integral component assures good bonding with the outer anode stud 760.

The components of the foregoing example embodiments can be pre-fabricated or specifically generated (e.g., by shaping a malleable body) for a particular heat exchanger, heating system, and/or environment. The components of the example embodiments described herein can have standard or customized features (e.g., shape, size, features on the inner or outer surfaces). Therefore, the example embodiments described herein should not be considered limited to creation or assembly at any particular location and/or by any particular person.

The water heater, the heat exchanger, and the components therein can be made of one or more of a number of suitable materials and/or can be configured in any of a number of ways to allow the water heater and the heat exchanger to meet certain standards and/or regulations while also maintaining reliability of the water heater, regardless of the one or more conditions under which the water heater can be exposed. Examples of such materials can include, but are not limited to, aluminum, stainless steel, ceramic, fiberglass, glass, copper, plastic, zinc, zinc alloy, magnesium, magnesium alloy and/or aluminum for example.

The example components of the water heating devices and heat exchangers described herein can be made from a single piece (e.g., as from a mold, injection mold, die cast, 3-D printing process, extrusion process, stamping process, crimping process, and/or other prototype methods). In addition, or in the alternative, the example components of the water heating devices and heat exchangers described herein can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

As used herein, a "coupling feature" can couple, secure, fasten, abut, and/or perform other functions aside from merely coupling. A coupling feature as described herein can allow one or more components of a heat exchanger to become coupled, directly or indirectly, to another portion (e.g., an inner surface) of the heat exchanger. A coupling feature can include, but is not limited to, a snap, a clamp, a portion of a hinge, an aperture, a recessed area, a protrusion, a slot, a spring clip, a tab, a detent, a compression fitting, and mating threads. One portion of an example heat exchanger can be coupled to a component of a heat exchanger and/or another portion of the heat exchanger by the direct use of one or more coupling features.

In addition, or in the alternative, a portion of an example heat exchanger can be coupled to another component of a heat exchanger and/or another portion of the heat exchanger using one or more independent devices that interact with one or more coupling features disposed on a component of the heat exchanger tube. Examples of such devices can include, but are not limited to, a weld, a pin, a hinge, a fastening device (e.g., a bolt, a screw, a rivet), epoxy, adhesive, and a spring. One coupling feature described herein can be the same as, or different than, one or more other coupling features described herein. A complementary coupling feature as described herein can be a coupling feature that mechanically couples, directly or indirectly, with another coupling feature.

Any component described in one or more figures herein can apply to any other figures having the same label. In other words, the description for any component of a figure can be considered substantially the same as the corresponding component described with respect to another figure. For any figure shown and described herein, one or more of the components may be omitted, added, repeated, and/or substituted. Accordingly, embodiments shown in a particular figure should not be considered limited to the specific arrangements of components shown in such figure.

Water heating devices and heat exchangers can be subject to complying with one or more of a number of standards, codes, regulations, and/or other requirements established and maintained by one or more entities. Examples of such entities can include, but are not limited to, the American Society of Mechanical Engineers (ASME), American National Standards Institute (ANSI), Canadian Standards Association (CSA), the Tubular Exchanger Manufacturers Association (TEMA), the American Society of Heating, Refrigeration and Air Conditioning Engineers (ASHRAE), Underwriters' Laboratories (UL), the National Electric Code (NEC), the Institute of Electrical and Electronics Engineers (IEEE), and the National Fire Protection Association (NFPA). The example water heating devices described herein allow the water heater to continue complying with such standards, codes, regulations, and/or other requirements. In other words, the example water heaters described herein do not compromise compliance with any applicable codes and/or standards.

Terms such as "first," "second," "top," "bottom," "left," "right," "end," "back," "front," "side", "length," "width," "inner," "outer," "above", "lower", and "upper" are used merely to distinguish one component (or part of a component or state of a component) from another. Such terms are not meant to denote a preference or a particular orientation unless specified and are not meant to limit embodiments of water heating devices or heat exchangers. In the foregoing detailed description of the example embodiments, numerous specific details are set forth in order to provide a more thorough understanding of the disclosure. However, it will be apparent to one of ordinary skill in the art that the example embodiments may be practiced without these specific details. In other instances, well-known features have not been described in detail to avoid unnecessarily complicating the description.

Accordingly, many modifications and other embodiments set forth herein will come to mind to one skilled in the art to which example water heaters pertain having the benefit of the teachings presented in the foregoing descriptions and the associated drawings. Therefore, it is to be understood that example water heaters are not to be limited to the specific embodiments disclosed and that modifications and other embodiments are intended to be included within the scope of this application. Although specific terms are employed herein, they are used in a generic and descriptive sense only and not for purposes of limitation.

The invention claimed is:

1. A heat exchanger comprising:
an end plate;
a series of heat exchanger tubes extending from the end plate;
a header attached to the end plate, the header comprising:
an inlet defining an inlet flow path; and
an outlet defining an outlet flow path;
wherein a fluid is configured to enter the heat exchanger through the inlet, via the inlet flow path, and exit the heat exchanger through the outlet, via the outlet flow path; and
an anode assembly comprising:
an anode housing; and
an anode disposed at least partially within the anode housing;
wherein the anode assembly is attached, outside of the header, to the inlet of the header perpendicular to the inlet flow path; and
wherein the inlet and the inlet flow path are parallel with the series of heat exchanger tubes, such that when the fluid enters the heat exchanger through the inlet, the fluid flows in a substantially straight path from the inlet and through the inlet flow path to the series of heat exchanger tubes.

2. The heat exchanger of claim 1, wherein the anode is a passive anode.

3. The heat exchanger of claim 1, wherein the anode comprises an inner anode portion and an outer anode stud, wherein the outer anode stud is configured to be attached to a bonding wire, the bonding wire also being connected to the end plate of the heat exchanger.

4. The heat exchanger of claim 1, wherein the anode assembly is configured to be removably attached to the header.

5. The heat exchanger of claim 4, wherein the anode assembly further comprises an adapter configured to facilitate attachment of the anode assembly to the header.

6. The heat exchanger of claim 5, wherein the adapter is configured to be attached to a distal end of the inlet of the header.

7. The heat exchanger of claim 1, wherein the anode assembly is positioned below the inlet of the header of the heat exchanger.

8. The heat exchanger of claim 7, where the header further comprises a pressure relief valve positioned on the inlet of the header, one or more temperature limit switches, a pressure switch, a temperature sensor, a bypass valve within the inlet of the header, and/or a thermal governor valve adjacent to the inlet of the header.

9. The heat exchanger of claim 1, wherein the fluid is configured to contact the anode prior to the fluid entering the heat exchanger.

10. A water heater comprising:
a combustion chamber; and
a heat exchanger disposed within a housing of the water heater, the heat exchanger comprising:
an end plate;
a series of heat exchanger tubes extending from the end plate;
a header attached to the end plate outside of the housing of the water heater, the header comprising:
an inlet; and
an outlet; and
an anode assembly comprising:
an anode housing; and
an anode disposed at least partially within the anode housing, the anode comprising:
an inner anode portion enclosed within the anode housing; and
an outer anode stud; and
a bonding wire attached to the outer anode stud;
wherein the anode assembly is attached, outside of the header, to the inlet of the header adjacent to an inlet opening and perpendicular to an inlet flow path at the inlet opening; and
wherein the bonding wire is attached to the end plate of the heat exchanger.

11. The water heater of claim 10, wherein the anode assembly is configured to be fixedly attached to the header.

12. The water heater of claim 10, wherein the anode assembly is configured to be removably attached to the header.

13. The water heater of claim 12, wherein the anode assembly further comprises an adapter configured to facilitate attachment of the anode assembly to the header.

14. The water heater of claim 10, wherein the anode is a passive anode.

15. The water heather of claim 10, wherein the water heater is a pool water heater.

16. A pool water heater comprising:
a housing having an exhaust vent positioned in a sidewall thereof;
a combustion chamber positioned within the housing, the combustion chamber being configured to receive combustible fuel from a fuel line in fluid communication therewith;
a heat exchanger disposed within the housing and in operable communication with the combustion chamber, the heat exchanger comprising an end plate and a series of heat exchanger tubes extending from the end plate;
a header attached to the end plate outside of the housing, the header comprising an inlet and an outlet; and
an anode assembly comprising:
an anode housing; and
an anode disposed at least partially within the anode housing, the anode comprising:
an inner anode portion; and
an outer anode stud;
wherein the anode assembly is attached to the inlet of the header of the heat exchanger, outside of the header, adjacent to an inlet opening and perpendicular to an inlet fluid flow path at the inlet opening, such that a fluid contacts the anode along the inlet flow path prior to entering the heat exchanger.

17. The anode assembly of claim 16, wherein the anode is a passive anode.

18. The anode assembly of claim 16, further comprising a bonding wire attached to the outer anode stud and the header of the heat exchanger.

19. The anode assembly of claim 16, further comprising an adapter configured to facilitate attachment of the anode assembly to the inlet of the header of the heat exchanger.

* * * * *